United States Patent [19]

Ducrohet

[11] 3,990,805
[45] Nov. 9, 1976

[54] ARRANGEMENT FOR DETECTING THE STATE OF A TOOL

[75] Inventor: Jean Michel Ducrohet, Paris, France

[73] Assignee: Regle Nationale des Usines Renault, Boulogne-Billancourt, France

[22] Filed: Sept. 17, 1974

[21] Appl. No.: 506,705

[30] Foreign Application Priority Data

Dec. 4, 1973  France .............................. 73.43253

[52] U.S. Cl. ................................... 408/6; 324/161; 324/166; 408/11
[51] Int. Cl.² ........................................ B23B 49/00
[58] Field of Search .............. 408/6, 8, 11; 324/161, 324/166, 173, 181

[56] References Cited
UNITED STATES PATENTS

| | | | |
|---|---|---|---|
| 3,310,796 | 3/1967 | Sanders | 408/6 X |
| 3,621,395 | 11/1971 | Brown et al. | 324/181 |
| 3,747,085 | 7/1973 | Bala et al. | 408/6 X |
| 3,817,647 | 6/1974 | Lemelson | 408/6 X |

Primary Examiner—Othell M. Simpson
Assistant Examiner—Z. R. Bilinsky
Attorney, Agent, or Firm—Oblon, Fisher, Spivak, McClelland & Maier

[57] ABSTRACT

A system is disclosed for detecting the state of a rotating machining tool, such as a drill bit, in a machining head. The system employs an electromagnetic detector having a coil connected in series with an oscillating circuit. As the tool rotates, its lands and flutes cause detectable variations in reluctance which are used to modulate the output of the oscillator circuit. The modulated oscillator output is monitored as an indication of the state of the tool.

4 Claims, 4 Drawing Figures

ARRANGEMENT FOR DETECTING THE STATE OF A TOOL

BACKGROUND OF THE INVENTION

1. Field of the Invention

The present invention concerns an arrangement for permitting detection of the state of a machining tool rotating in a machining head. This arrangement is especially designed to be used in the field of machine tools and in particular for the detection of the presence and the rotation of a drill mounted on a drilling spindle on a special machine such as those used in the automoble industry.

2. Description of the Prior Art

It is known that in machine tools used for automatic machining, and particularly in multiple-operation machines, it is necessary to maintain a continual watch on the state of the tools and to stop the machine as soon as breakage of a tool has been detected. It is essential that the machine be stopped as quickly as possible since any delay in the detection of such an occurrence results in ruining a large number of parts being machined. Moreover, such tool breakage causes breakage of tools at subsequent stations and damage to the machinery itself. Such is the case, for example, when a tap is damaged because it cannot penetrate where a hole, supposed to have been drilled out at the preceding station, is defective because of breakage of the drill.

To take care of these problems, a known method is to provide special stations after the machining units to verify that the necessary operations have been performed well and that no fragments of broken tools are present in drilled holes, for example. Such special stations commonly have a test plate mounted on the end of a screw jack rod so as to be able to slide along it, the plate being furnished with fingers which can penetrate, under the action of the screw jack, into the properly drilled and cleared holes. In case a bad machining operation occurs at a drilling station, the fingers on the plate cannot penetrate the holes which causes retraction of the plate sliding on the rod of the jack screw which can then actuate a switch stopping the multiple-operation machine.

It is apparent however that the presence of these special stations complicates the operation of the machine. In addition, various types of tool sensors have already been utilized, the action of which can be mechanical, pneumatic or optical, all of which are deficient in some manner.

The arrangements for detection with mechanical sensing devices are cumbersome, of little practical use and in some cases require withdrawal of the tool from its guide tube for checking which risks damaging the tool.

Arrangements with mechanical feelers are also known in which the tool, such as a drill, does not leave its guide tube. The indication given by such detection arrangements are unreliable, however since foreign bodies such as pieces of broken tools, shavings, cutting oil, etc. can act on the feeler in the same way as the tool, the presence of which is to be verified.

Also known are pneumatic detectors consisting of an air jet directed radially near the end of the drill. In such detection arrangements, the indication furnished by the detector can depend on the speed of rotation of the drill, a predetermined value of which can thus be detected. However, a fixed piece like a shaving can completely block the passage of the compressed air across the guide tube and have the same effect on such a pneumatic detector as a drill turning at high speed.

SUMMARY OF THE INVENTION

Accordingly, one object of the present invention is the realization of an arrangement for detecting the state of a machining tool driven in rotation which can distinguish in all cases the rotating tool from another unwanted body such as a piece of a broken tool, a shaving, etc.

Another object of the present invention is the provision of a detection arrangement which is less cumbersome and can be mounted readily on the machine itself.

Yet another object of the invention is the provision of a method of detecting the state of a rotating machining tool in which the rotation of the tool is used to modulate a train of electromagnetic waves, the modulation frequency of which is then detected so as to obtain an indication of the speed of rotation of the machining tool.

Briefly, these and other objects of the invention are achieved by providing an external guiding piece through which a tool can pass and detection means located in the guiding piece so as to act radially on the end of the tool when the machining head is in its extreme retracted position. According to the invention, the detection means consists of an electromagnetic detector provided with an oscillator able to develop a signal modulated by the rotation of the machining tool.

In a preferred embodiment, the detection means also includes a rectifying circuit and means for obtaining a rectified square wave followed by an integrator circuit. A circuit with an adjustable threshold voltage is preferably connected to the preceding elements so as to furnish a signal only when the speed of rotation of the tool exceeds a predetermined value.

In a preferred embodiment of the detection arrangement of the present invention, the end of the hole containing the electromagnetic detector opening into the bore of the guiding piece within which the machining tool rotates, is blocked by a material of high abrasion resistance obtained by hardening of a paste composed essentially of a binder and a non-metallic filler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
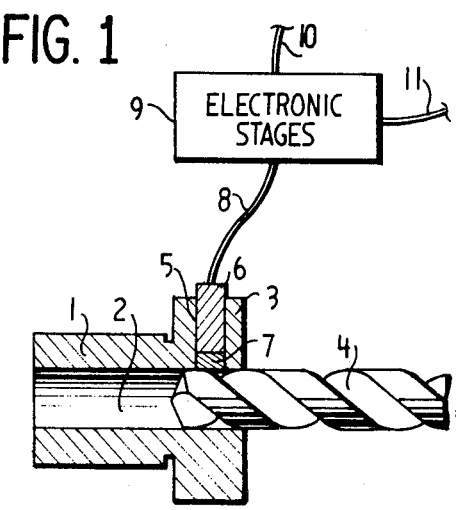
FIG. 1 shows schematically an arrangement for detection of the breakage of a drill in accordance with the invention.

Referring now to the drawings, wherein like reference numerals designate identical or corresponding parts throughout the several views, and more particularly to FIG. 1 thereof, the detection arrangement of the invention comprises a guiding tube 1 having a bore 2 and a flange 3 at one end. During machining, a drill 4 is rotated by a drilling head, not shown in the figure, which can move axially so as to slide the drill 4 through the bore 2 of tube 1, the flange 3 acting as the guiding piece for the drill.

The flange 3 has a radial hole 5 opening into the bore 2 and containing an electromagnetic detector 6 which is separated from the drill 4 by a plug 7, the external face of which next to the drill 4 completely blocks the hole 5 leaving no break in the continuity of the surface of the bore 2.

The electromagnetic detector 6 is connected by the conducting leads 8 to a box 9 containing the electronic stages which will be explained later. The box 9 is supplied, for example, with D.C. power by means of the wires 10. Finally, the wires 11 transmit a signal if the drill is correctly detected as will be seen below.

Figure 2:
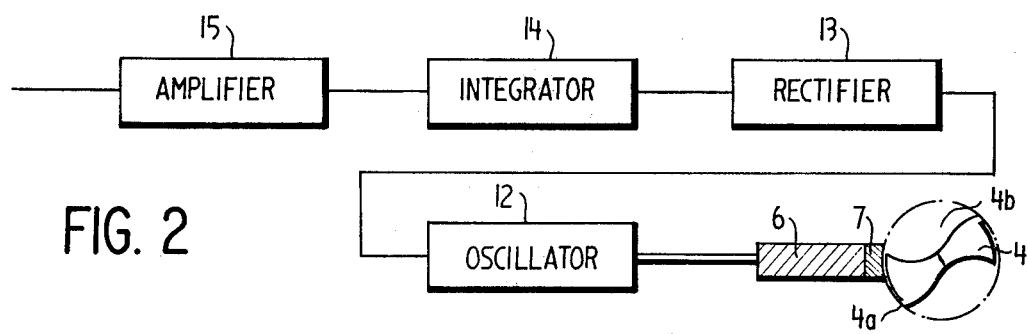
FIG. 2 is a functional block diagram of the arrangement of FIG. 1.

As can be seen in FIG. 2, the different electronic stages connected to the detector proper 6, are, in order, an oscillator 12, a rectifying circuit 13 provided with an electronic release or "trigger", an integrator circuit 14 and an output amplifier 15.

The detection arrangement of the present invention works in the following manner. After a machining operation the drilling head, not shown in the figures, draws back until the drill 4 reaches the position shown in FIG. 1. It is seen that in this position the end of the drill still projects into the bore 2 of the flange 3 of tube 1. The drill 4 is still being rotated by the drilling head.

Figure 3:
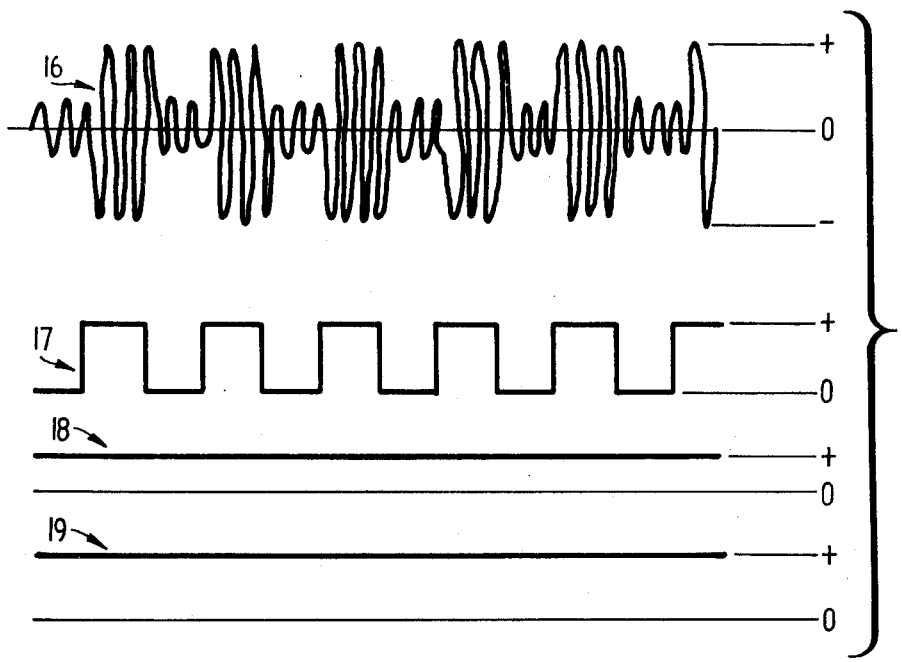
FIG. 3 shows the waveforms of the signals at different points in the block diagram of FIG. 2.

The electromagnetic detector 6 has a winding (not shown in the figure) connected in series in the circuit of oscillator 12. The rotation of drill 4 in front of this winding of detector 6 causes by alternating passage of a land 4a and a flute 4b of the drill 4, a variation in the reluctance of the region near detector 6. There is thus obtained at the output of oscillator 12 a wave train modulated as a function of the speed of rotation of drill 4 as shown at 16 in FIG. 3.

The rectifier 13 changes the sign of the negative half-cycles and the trigger produces the rectified square wave 17. The integrator 14 produces the steady signal 18, the voltage of which is a function of the speed of rotation of the drill.

A comparator with an adjustable threshold, not shown in the figures, may advantageously be placed after the integrator 14 so as to block the signal 18 unless it exceeds a predetermined voltage corresponding to a given speed of rotation of the drill. Finally the output amplifier 15 supplies the steady signal 19.

It is seen then that the output signal 19 is obtainable only if the following three conditions are simultaneously satisfied:

the drill 4 is present before detector 6 which means the drill has not broken;

the drill 4 is rotating;

and finally, the speed of rotation of the drill 4 is at least equal to a predetermined value.

It is understandable that the presence of a shaving or of any other piece of material inside the bore 2 will in no case be able to cause the generation of the signal 19 since the signal 16 from the oscillator will not be modulated. Thus, thanks to the arrangement of the present invention, practically all the chance causes of false detection are avoided.

The plug 7 can well be made from a paste or cement which is easily worked cold and hardens at ordinary temperatures so that after hardening it is sufficiently tough to resist wear to about the same degree as the material of which tube 1 is made, i.e., generally steel. Preferably a paste composed of a binder associated with non-metallic fillers would be used. Any other mode of realizing this plug could be used provided it does not affect the modulation of the signal.

The following example illustrates a composition which may well be used:

| INGREDIENTS | % BY WEIGHT |
| --- | --- |
| Hardenable resin | 50 |
| Hardener | 5 |
| Alumine | 10 |
| Silica gel | 35 |

Figure 4:
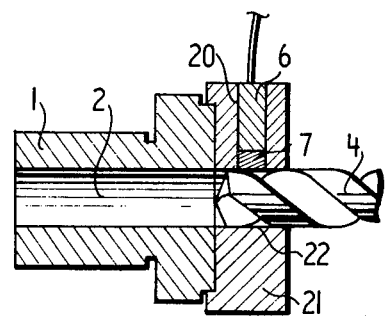
FIG. 4 shows schematically a variant of the arrangement of FIG. 1.

In certain special cases a different embodiment such as that in FIG. 4 is conceivable. In this variation it is seen that the electromagnetic detector 6 and the plug 7 are situated in a hole 20 made in a cap 21 attached to the guide tube 1 and acting as the guide for the drill 4. In this case, the retraction of the drilling head locates the drill 4 so that its end is in front of the detector 6 in the bore 22 of cap 21. Of course the cap 21 could just as well be mounted on a part other than the guide tube 1 of drill 4.

In the embodiment described above, the box containing the electronic elements of the detector was located at some distance from the detector proper. It is possible, of course, to bring together all the various circuits previously described in a single small unit. In this case it is no longer just the detector proper which is located in a radial hole close to the rotating tool, but the entire collection of detector circuits, the detecting face being oriented to face the rotating tool.

The present invention can be used to check the state of the drills on drilling machines. The invention can also be used for the detection of other types of rotating tools provided they exhibit sufficiently large peripheral discontinuities. Thus it will be possible to use the arrangement and the method of the present invention for detecting the state of rotating tools such as taps, milling tools, reamers, etc.

Obviously, numerous modifications and variations of the present invention are possible in light of the above teachings. It is therefore to be understood that within the scope of the appended claims, the invention may be practiced otherwise than as specifically described herein.

We claim:

1. A system for detecting the rotation of a machining tool driven by drive means for machining a workpiece held by a work holder comprising:

a machining tool, a guiding tube having a bore therein disposed intermediate the drive means and the work holder, an electromagnetic detector disposed in an aperture in the guiding tube to detect the rotation of the machining tool in its fully retracted position prior to machining of the workpiece by the machining tool, means connected to the electromagnetic detector for generating a signal indicating the presence of the machining tool, the rotation of the machining tool and sufficient speed of rotation of the machining tool.

2. A system in accordance with claim 1 wherein the means for generating a signal comprises an oscillator whose input is connected to the output of the electromagnetic detector, a rectifying circuit with trigger whose input is connected to the output of the oscillator, an integrator circuit whose input is connected to the output of the rectifying circuit with trigger and an output amplifier whose input is connected to the output of the integrator circuit.

3. A system in accordance with claim 1 wherein a material of high abrasion resistance is positioned in the aperture in the guiding tube to separate the electromagnetic detector from the machining tool, the material comprising a hardened paste comprising a binder and non-metallic fillers.

4. A system as in claim 3, wherein: said paste comprises 50% by weight of a hardenable resin, 10% by weight of alumina and 30% by weight of silica gel.

* * * * *